United States Patent [19]

Armington et al.

[11] 4,124,123
[45] Nov. 7, 1978

[54] STORAGE FRAMEWORK AND METHOD

[75] Inventors: Raymond Q. Armington; Wayne G. Atwater, both of Willoughby; Charles F. Longaker, Mentor, all of Ohio

[73] Assignee: The Triax Company, Cleveland, Ohio

[21] Appl. No.: 631,186

[22] Filed: Nov. 12, 1975

[51] Int. Cl.² .............................................. A47F 5/00
[52] U.S. Cl. ................................... 211/186; 52/174; 52/648; 211/191; 214/16.4 A; 403/262
[58] Field of Search .............. 211/134, 193, 191, 186, 211/182, 183; 403/388, 245, 410, 262, 230, 187, 189; 52/758 C, 758 F, 731, 721; 214/16.4

[56] References Cited

U.S. PATENT DOCUMENTS

| | | | |
|---|---|---|---|
| 2,922,542 | 1/1960 | Barr | 52/758 F |
| 3,664,513 | 5/1972 | Atwater | 211/134 |
| 3,685,665 | 8/1972 | Atwater | 211/191 |
| 3,716,959 | 2/1973 | Bernardi | 52/721 |
| 3,840,124 | 10/1974 | Atwater | 211/183 X |
| 3,977,801 | 8/1976 | Murphy | 403/189 |

*Primary Examiner*—James T. McCall
*Assistant Examiner*—Robert W. Gibson, Jr.
*Attorney, Agent, or Firm*—Baldwin, Egan, Walling & Fetzer

[57] ABSTRACT

A structural unit, such as for instance a storage framework composed of a plurality of storage frame components assembled into a storage rack, for use, for example, in warehousing systems. The framework comprises generally vertical column members which in certain embodiments are basically of a generally U-shaped configuration in horizontal cross section, but having a connecting or bridging plate or member disposed between and connected to the arms of the U, with the bridging member being preferably recessed inwardly from the distal ends of the arms. A fastener means, such as for instance a threaded stud, is secured to the bridging plate and projects generally perpendicularly outwardly therefrom. In other embodiments the column members are tubular and of polygonal configuration in horizontal cross section with the studs secured to spaced plates attached to one face of the respective column. Laterally extending connecting assemblies including load carrying means, are connected to and spaced vertically along the columns, and define the storage volumes in the storage rack. The connecting assemblies include vertically elongated end members having an opening therethrough through which is received a respective stud. In certain embodiments the end members are adapted to be deformed or prestressed upon tightening actuation of an associated fastener such as for instance a threaded nut, on the stud, thereby enhancing the rigidity of the connection at the fastener. One advantage of this arrangement over prior art is that generally standard structural components can be utilized in the formulation of the framework rather than requiring the necessity of substantial amounts of custom made components, and mass production of the framework components is facilitated. A method of eliminating the need for diagonal bracing in the ladders of the storage framework is likewise disclosed, and in a manner whereby the diagonal integrity of the load supporting assemblies of a storage rack is maintained.

6 Claims, 28 Drawing Figures

STORAGE FRAMEWORK AND METHOD

This invention relates primarily to knock-down structure components for use in the building of a structural unit, such as for instance a storage rack for warehousing systems, and especially automatic warehousing systems, and wherein the storage rack comprises a plurality of spaced columns secured by a novel arrangement to connecting assemblies extending laterally between the columns, for improving the rigidity of the storage rack, and increasing its resistance to joint separation of the columns and connecting assemblies, and with generally standard structural components being utilized to form the storage rack structure. In one embodiment, prestressing or predetermined initial deformation of certain components of the connecting assemblies is provided for, to increase the rigidity of the structure. In another embodiment, the arrangement is such that no substantial initial deformation or prestressing occurs in the confronting parts at the connections, but the connections are such that substantial rigidity is still provided for. The component parts of the storage rack are adapted for assembly at the site of use, resulting in expeditious manufacture, handling, transporting and assembly of the storage rack. The need for conventional diagonal bracing in the "ladders" of the storage rack, is eliminated.

BACKGROUND OF THE INVENTION

In U.S. Pat. No. 3,840,124 issued Oct. 8, 1974, to Wayne G. Atwater and entitled Knock-Down Storage Frame, Components Therefor, and Method of Assembly, there is disclosed a storage rack for warehousing systems wherein the connection of the columns with the laterally extending connecting assemblies include deformation of a web-like portion of the confronting members at the connection, by actuation of fastener means, which prestresses the web-like portion, and enhances the rigidity of the connection. U.S. patent application, Ser. No. 555,800, filed Mar. 6, 1975, which is a continuation of U.S. Ser. No. 484,427 (abandoned) which in turn was a division of aforementioned U.S. Pat. No. 3,840,124, concerns the method disclosed in U.S. Pat. No. 3,840,124.

SUMMARY OF THE INVENTION

The present invention provides various structural components and assemblies for forming a structural unit such as a storage rack for use in warehousing systems, wherein the column members are of fabricated construction, being in certain embodiments basically of generally U-shape in horizontal section with a bridging plate connecting the arms of the U, and with a fastener stud secured to said bridging plate and projecting outwardly therefrom intermediate the arm portions, and with a cross portion on the column confronting laterally extending connecting member being adapted for engagement with the bridging plate, said cross portion having an opening therethrough receiving the respective stud on the bridging plate. In certain embodiments, the bridging plate is recessed with respect to the free end portions of the arms of the column configuration, whereby the cross portion bridges the end portions, and is deformed inwardly toward the column member upon tightening actuation of the associated stud fastener, thus prestressing the connection and enhancing the rigidity of the connection at the fastener. Also an arrangement of the columns and the connecting member is provided which does not embody prestressing of the connecting member, but still provides a highly rigid connection between the laterally extending connecting member and the spaced respective outer and inner column members of the storage rack. The need for diagonal bracing in the "ladders" of the storage rack is eliminated.

Accordingly, an object of the invention is to provide a storage framework which can be readily assembled on site and wherein a simplified arrangement is provided for providing for highly rigid connections in the framework.

Another object of the invention is to provide a storage framework which can be readily assembled on site and wherein the columns of the storage framework have laterally spaced projecting elements thereon, with an actuatable fastener means disposed intermediate the projecting elememts adapted for coaction with a generally planar end plate of a confronting laterally extending connecting member assembly, for providing for deformation and prestressing of the plate at the respective fastener connection, in order to enhance the rigidity of the structure.

A still further object of the invention is to provide a storage framework wherein the load bearing connecting members projecting laterally from the column members of the framework are of a structure and are attached thereto in a manner which provides for improved rigidity of the connections.

Another object of the invention is to provide a fabricated column member for a storage rack of the above discussed type wherein the column member comprises a series of vertically stacked sections each of which has a thinner wall thickness as compared to the underlying section, and which are rigidly connected together, with such column member basically being generally U-shaped in horizontal section, and with vertically spaced plates bridging the arms of the U generally adjacent the distal ends thereof, with fastener means secured to the bridging plates and projecting therefrom.

A further object of the invention is to provide an arrangement of the latter type wherein the bridging plates are recessed to provide laterally spaced projecting portions on the column member, with the fastener means comprising studs welded to the bridging plates and intermediate the projecting portions of the column.

Another object is to eliminate any need for diagonal bracing members in the "ladders" of the storage rack.

Other objects and advantages of the invention will be apparent from the following description taken in conjunction with the accompanying drawings wherein:

BRIEF DESCRIPTION OF THE DRAWINGS

FIG. 17 is a view generally similar to FIGS. 15 and 16, but illustrating a tubular column of polygonal horizontal section, with the illustrated stud of the connection secured to a pad or plate, which in turn is attached to a face of the column; FIG. 17 is enlarged and taken generally along the plane of line 17—17 of FIG. 18.

FIG. 18 is a fragmentary, broken, side elevational view of a portion of a ladder assembly embodying connecting member assemblies of the general type of FIG. 17.

DESCRIPTION OF PREFERRED EMBODIMENTS

Figure 1:
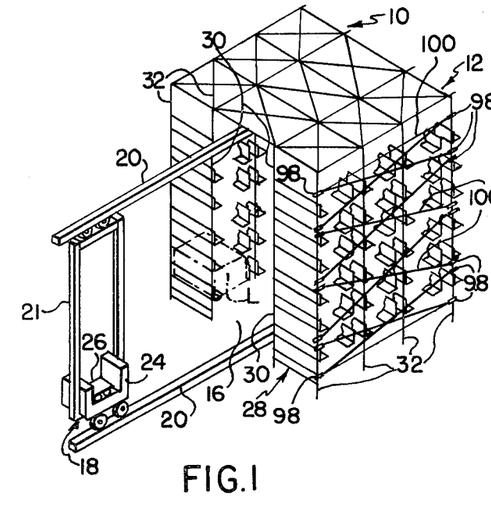
FIG. 1 is a fragmentary generally diagrammatic perspective illustration of a storage rack and associated mechanized load carrier in an automatic warehousing system which includes the connection arrangements of the invention.

Referring now again to the drawings, there is illustrated in FIG. 1 a portion of a storage rack of an automatic warehousing system comprising opposing storage sections 10 and 12 defining a plurality of horizontally and vertically arranged storage volumes or bins 14, which are adapted to store loads L therein, with the loads disposed in bridging relation across the associated load carrying members of the respective storage volume. In FIG. 1, there is a storage rack section disposed on each side of a centrally located travel zone 16 in which an automatic load carrier 18 is adapted to move on tracks 20, for handling loads at selected storage bin locations in the selected storage rack section.

The load carrier mechanism 18 may comprise a horizontally movable load carrier 21 on which is mounted a vertically movable elevator 24, which in turn carries a transversely or laterally movable extractor mechanism 26, for placing loads into or removing loads from a selected storage volume. Reference may be had to U.S. Pat. No. 3,139,994, issued July 17, 1964, in the name of A. R. Chasar and 3,402,835 issued Sept. 24, 1968, in the name of Sanford Saul, for more detail disclosures of automatic warehousing arrangements of the general type of which the present invention may be used.

Each storage frame section may be formed of a plurality of interconnected ladder assemblies (e.g. 28 — FIG. 4) which in turn are each comprised of an aisle post or column 30 adapted for disposal along a travel zone 16, and in longitudinal alignment with the aisle columns in the adjacent ladder assembly, and a laterally spaced outer column or post 32, which is adapted for alignment with the corresponding outer column in the adjacent ladder assembly.

Connecting member assemblies 34, 34a, 34b (FIG. 4) extend between and are adapted for connection to the respective aisle and outer column, to form the respective ladder assembly. Connecting members 34, 34a, 34b may be of the fabricated construction illustrated. The ladder components are so constructed and arranged that they can be expeditiously produced at a place of manufacture utilizing in line processes and procedures, and can be readily painted and handled during the manufacture thereof, and then can be bundled into compact bundles and shipped to the site of use, where the frame components can be readily assembled together into "ladders" and thence into complete storage racks, thereby obviating many of the problems associated with the manufacturing and shipping of the storage rack components.

Figure 2:
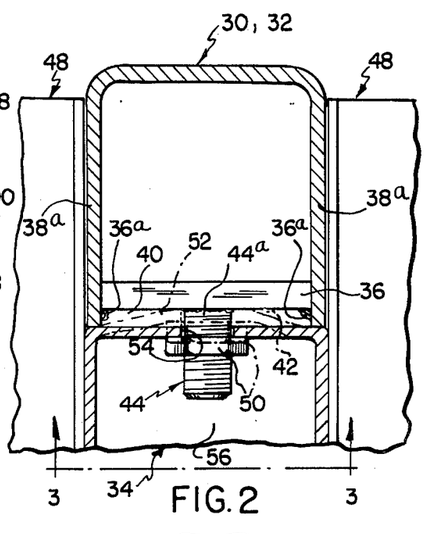
FIG. 2 is an enlarged sectional view taken generally along the plane of line 2—2 of FIG. 3 looking in the direction of the arrows. In phantom lines there is shown the deformed condition of the end or cross member of the connecting member assembly upon tightening actuation of the associated fastener means.

The columns 30, 32 of the ladder assemblies may be cold formed from plate stock into the generally U-shaped (in horizontal section) configuration, with the arms of the U being connected by bridging portions 36, secured to the inner surfaces of the arms of the U as by welds 36a (FIG. 2). In the embodiment illustrated in FIG. 2, the bridging member 36 is recessed inwardly from the projecting outer end extremities of the arms 38a of the U configuration, to provide a predetermined spacing 40 between the bridging member 36 and the confronting cross member 42 of the associated connecting member assembly 34, 34a, 34b. Fastener means 44, which in the embodiment illustrated are threaded studs, are secured, as by welds 44a, to the bridging member 36.

Figure 4:
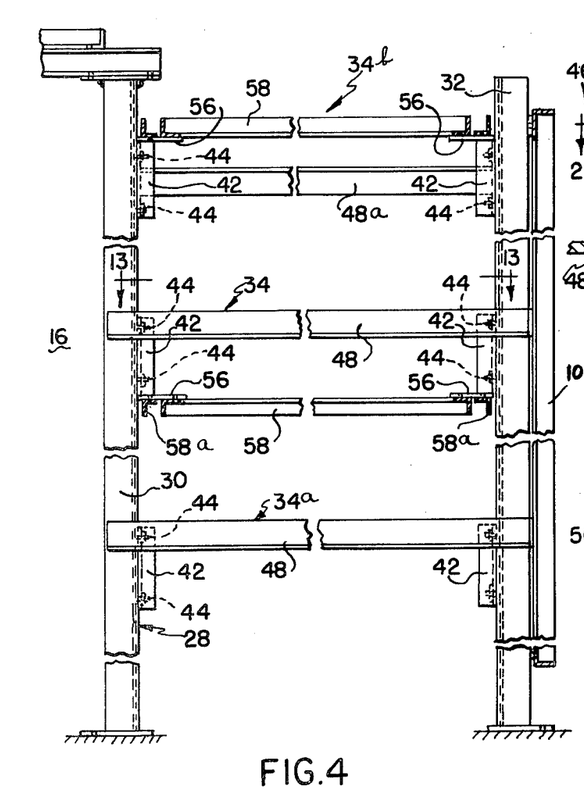
FIG. 4 is a broken elevational view of one of the ladder sub-assemblies which may be assembled in the form illustrated at the site of use and which forms one of the components of the completed storage rack. The ladder assembly illustrated is comprised of vertical load bearing columns connected by laterally extending connecting members or assemblies, fastened with mechanical fasteners to the confronting columns. The connecting members are so constructed and arranged that upon tightening actuation of the fasteners, a highly rigid connection is formed between the generally load bearing laterally extending connecting members or assemblies and the associated columns.
Figure 13:
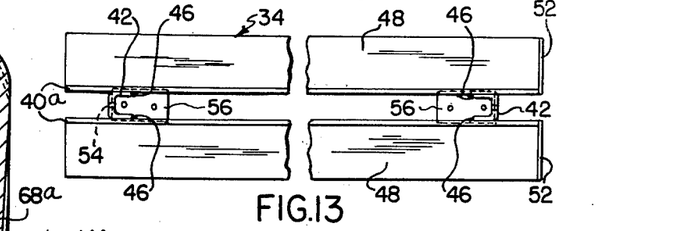
FIG. 13 is a broken top plan view of one of the load carrying connecting members or assemblies utilized in the FIG. 4 ladder structure.
Figure 14:
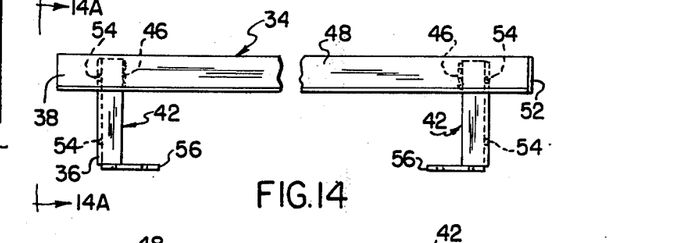
FIG. 14 is a side elevational view of the FIG. 13 connecting member assembly.
Figure 14A:
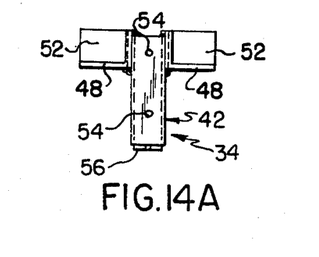
FIG. 14A is an end elevational view taken generally along line 14A—14A of FIG. 14.

Referring now in particular to FIGS. 13, 14 and 14A, a connecting member load support assembly 34 or 34a defining the respective storage volume or bin within the storage rack and for supporting loads thereon, is illustrated in detail. Lateral pairs of the assemblies support loads thereon in bridging relation, with the loads being deposited on or removed from the load support assemblies by means of the aforementioned mechanized load carrier 18, with the extractor 26 on elevator 24 being extendible out into and retractable from the selected bin or volume, to handle a load L thereat. Each connecting member load support assembly is adapted for attachment to the spaced associated columns 30, 32 of an associated ladder, (FIG. 4).

Figure 3:
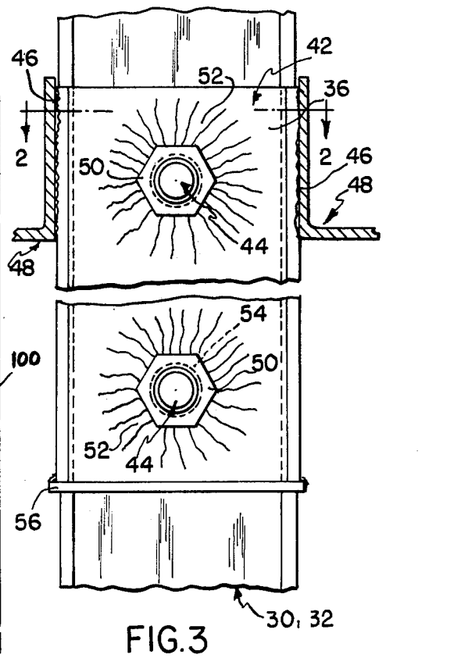
FIG. 3 is a fragmentary partially broken elevational view of the connection illustrated in FIG. 2, illustrating the deformed condition of the cross member.

In the connecting member load support assembly of FIGS. 13 and 14, the end cross members 42 are secured as by welds 46 to lateral elongated load support rails 48 which may be of angle configuration in end elevation (FIGS. 3 and 14A). The columns 30, 32 are received in generally nested relation between the outer ends of the assembly 34, as shown in FIG. 2, and are attached to the respective cross member 42 by fasteners 44. A nut 50 coacts with the stud in threaded relation. End abutment plates 52 may be provided for limiting movement of a load along rails 48.

The cross member or web 42 is relatively thin as compared to the thickness of the bridging plate or portion 36, and upon predetermined tightening actuation of fastener means 44, as by threaded tightening of nut 50, the cross member or web 42 of connecting member assembly 34 is deformed inwardly toward the confronting bridging member 36 adjacent the stud of the fastener means 44, as at 52 (FIGS. 2 and 3). This inward bulging of cross member 42 generally circumferentially of the fastener stud is continued preferably until engagement occurs between the bulge and the confronting surface of bridging portion 36. Opening 54 in cross portion or web 42 is preferably of such size or diameter so as to be able to receive the weld 44a of the stud (as well as the stud) without interference, so that engagement of the conical-like bulge on the cross member 42 can occur with the confronting surface of bridging member 36. Thus cross member 42 is prestressed, at the respective connection, whereby the rigidity of the connection is enhanced.

Spacing 40 may be in the order to 1/16 to ⅛ inch which has generally been found adequate to provide for prestressing deformation of the connecting member assembly web 42. As can be seen from FIG. 3 there is preferably provided a pair of vertically spaced fastener means 44 on the respective bridging member 36, coacting with a respective opening 54 in cross member 42.

The assembly 34 may include bottom plates 56 (FIG. 13) having openings therein adapted to receive fastener means such as a bolt and associated nut, for attaching diagonal cross struts 58 and stringer struts 58a (FIG. 4), for aiding in rigidifying adjacent ladder assemblies.

As can be seen from FIG. 3, cross members 42 are preferably in the form of channels, and are vertically elongated, so as to extend in the embodiments of assemblies 34, 34a well below the level of the load supporting rails 48. In the usual automatic warehousing environment, the vertical height of cross members 42 is preferably in the order of 8 to 10 inches. Such elongated cross members of assemblies 34, 34a, 34b coacting with the vertically spaced fastening means, provides for considerable rigidity of the connection of the columns 30, 32 with the laterally projecting connecting member assemblies 34, 34a, 34b.

Assembly 34b on the upper portion of the ladder 28 is not adapted to directly support storage loads thereon, as are assemblies 34 and 34a, but instead is a "spreader" coupled to the spaced columns 30, 32 by fasteners 44, coacting with the cross member channels 42 in a similar manner as for assemblies 34, 34a. Rail 48a extending between the end cross members 42 is secured as by welds, interiorly of the channels, rather than exteriorly thereof.

Referring now to FIGS. 5 through 9, there is illustrated another embodiment of column structure 30' or 32', which may be used to form a ladder assembly of the general type illustrated in FIG. 4. Each column 30' or 32' may be formed from sections of generally U-shaped (in horizontal section) channel which may be fabricated from plate similarly to that in the first described embodiment. The sections 62, 64, 66 (FIG. 5) forming the respective columns are stacked vertically on one another and secured as by welds. Each channel section in horizontal cross section comprises a base 68 with arm portions 68a projecting outwardly from the base.

Figure 5:
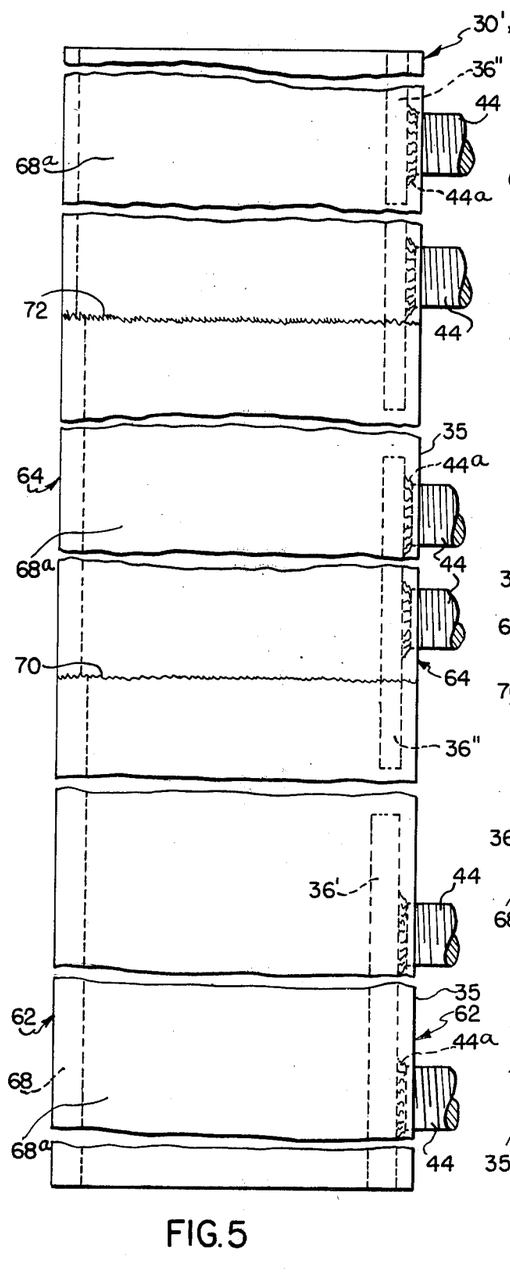
FIG. 5 is a broken side elevational view of one embodiment of the column members, formed of stacked sections secured together.
Figure 6:
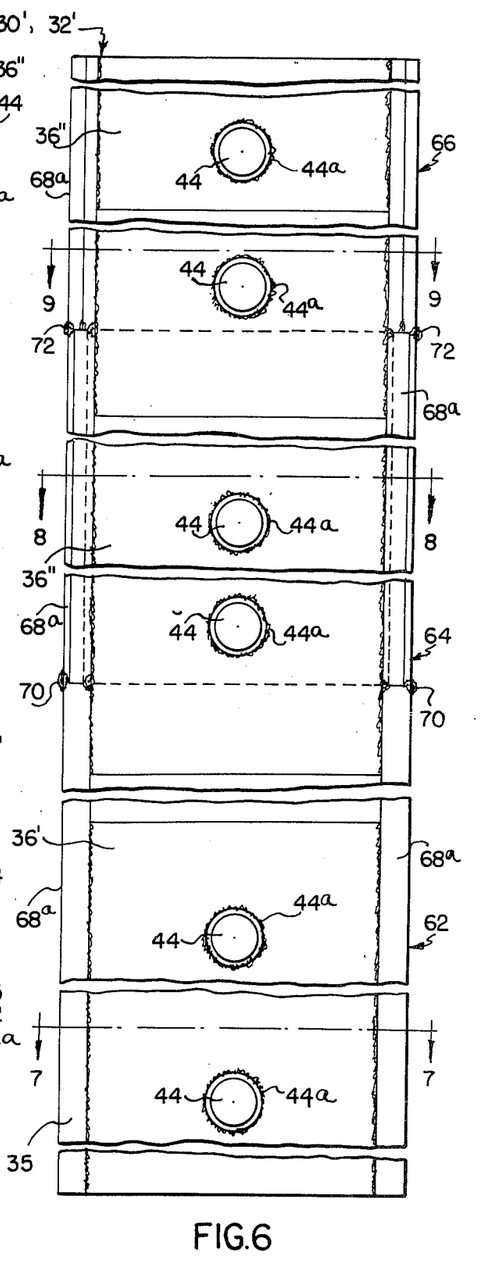
FIG. 6 is a broken front elevational view of the sectional column member of FIG. 5.
Figure 7:
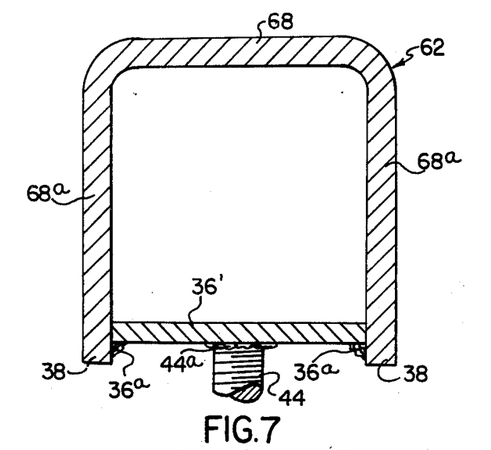
FIG. 7 is a sectional view taken generally along the plane of line 7—7 of FIG. 6 looking in the direction of the arrows.
Figure 8:
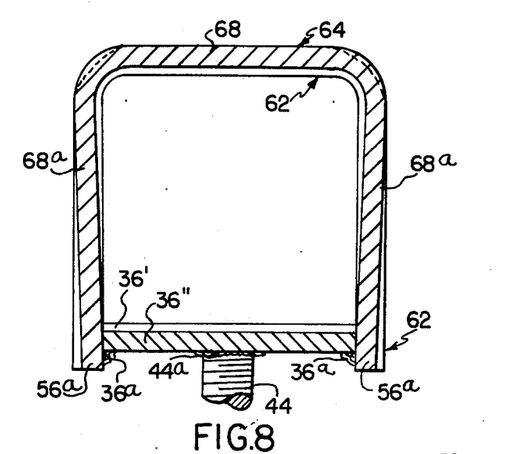
FIG. 8 is a sectional view taken generally along the plane of line 8—8 of FIG. 6 looking in the direction of the arrows.
Figure 9:
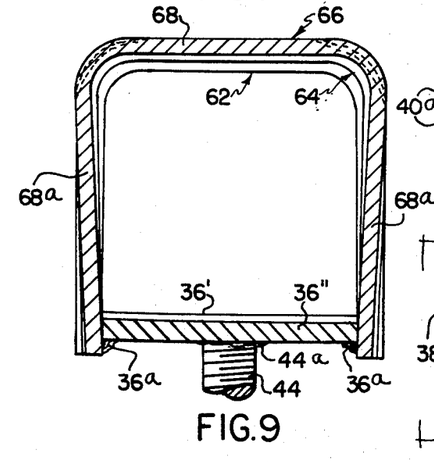
FIG. 9 is a sectional view taken generally along the plane of line 9—9 of FIG. 6 looking in the direction of the arrows.

Bridging plate 36' extends between the inner surfaces of the arms and is secured thereto as by means of the welds 36a. In the embodiment illustrated, bridging plate 36' is recessed inwardly from the forward or outer extremities 35 of the arms 68a. A pair of threaded studs 44 are secured to the bridging plate 36' intermediate the outer ends of the arms 68a and as by means of welds 44a. Bridging plate 36' is preferably of sufficient thickness and strength so that upon tightening actuation of the fastener 44, the bridging plate will not be visibly deformed. The recessed condition of the bridging plate with respect to the outer ends of the arms provides clearance for the deformation of the cross portion 42 of a connecting member assembly 34, 34a upon securing of the latter by the fastener means 44.

Section 64 of the column is stacked on top of section 62, and is welded thereto as at 70, but is of a slightly different wall thickness as compared to section 62. When stacked upon the lower section and welded thereto, such arrangement provides a rigid column. In the embodiment illustrated there is a further section 66 stacked on top of section 64, which further section is of a thinner wall thickness as compared to the thickness of the lower section 64, thereby providing for the effective welding as at 72 of the upper column section 66 to the lower, thicker wall section 64. The bridging plate 36' of lowermost column section 62 is preferably thicker than the bridging plates 36" of the middle and upper column sections. However, bridging plates 36" are still of sufficient thickness to support the studs 44 welded thereto without visible deformation, upon tightening actuation of the associated nuts. Preferably the bridging plates 36" on the middle and upper column sections extend downwardly into the respective underlying middle and lower column section, as can be seen in FIGS. 5 and 6.

Such a stacked sectional column construction provides a high-strength rigid column for use in high rise storage structures. and which columns can be readily fabricated on a production line basis.

Figure 15:
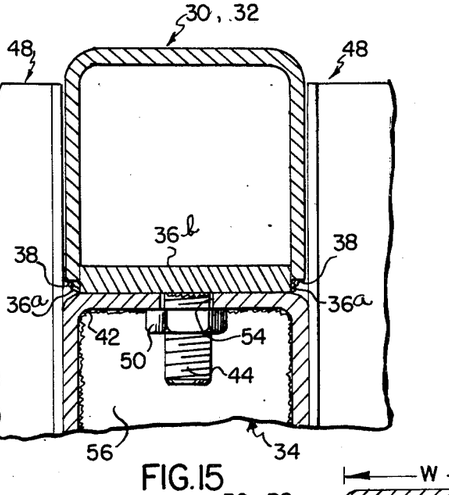
FIG. 15 is a sectional view generally similar to FIG. 2, but illustrating a modification.
Figure 16:
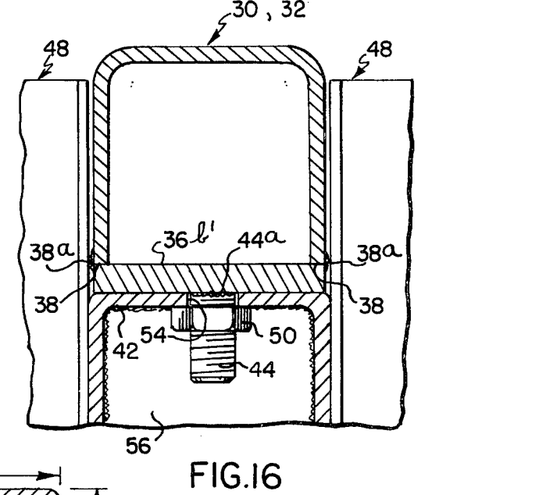
FIG. 16 is a view similar to FIG. 15 but showing a further modification.

Referring now to FIGS. 15 and 16 there are illustrated modified arrangements of column members, which may be utilized in a storage structure of the general type illustrated for instance in FIG. 1. Such arrangements do not provide for the preliminary deformation of the cross members of the connecting member assemblies, and thus provide no prestressing of the cross members. The bridging member 36b of the column is welded as at 36a, to the arms of the basically U-shaped column, with the front surface of the bridging plate being disposed outwardly of the outer ends 38 of the column arms. Thus the cross member 42 of the connecting member assembly 34 or 34a engages in flat surface-to-surface engagement with the front face of the bridging plate 36b which preferably extends vertically at least an extent equal to the vertical height of the respective cross member 42, with there being a pair of vertically spaced studs on the bridging plate received through a corresponding opening in the cross member 42, for drawing the bridging plate and cross member into tight engagement upon tightening of fasteners 50.

In the FIG. 16 embodiment, the bridging plate 36b' engages the outer ends 38 of the arms of the column, and is welded as at 38a. Some additional clearance may be provided for welds 38a, with the column between the load rails 48. Otherwise, this embodiment is similar to that of FIG. 15.

Figure 10:
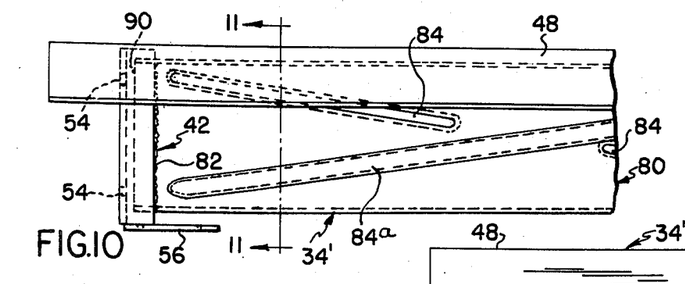
FIG. 10 is a fragmentary side elevational view of a modified form of load supporting connecting member or assembly, and having a reinforcing strut secured thereto.
Figure 11:
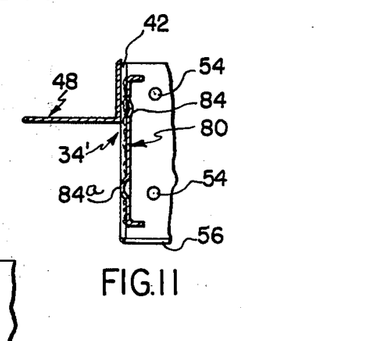
FIG. 11 is a fragmentary, sectional view taken generally along the plane of line 11—11 of FIG. 10, looking in the direction of the arrows.
Figure 12:
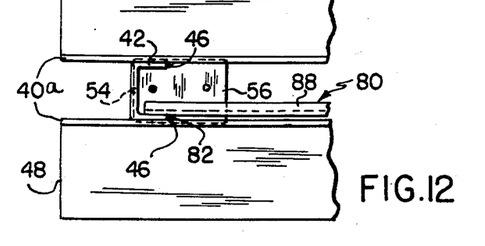
FIG. 12 is a fragmentary top plan view of the FIG. 11 assembly.

Referring to FIGS. 10 through 12, there is shown a modification 34' of connector assembly. The basic difference in this modified arrangement is that it has an additional strengthening web 80 secured as by welds 82 to the end cross members 42 of the connector assembly, with such strengthening member 80 being secured to the inner surface of the cross channel (FIG. 11). The purpose of web 80 is to provide additional diagonal rigidity to the assembly to eliminate or reduce the need for separate supplemental diagonal bracing, as commonly used, in ladder assemblies, as will be hereinafter discussed.

The strengthening member 80 preferably has ribs or embossments 84, 84a formed thereon by deforming the web 80 out of its plane. Embossments 84 are formed inwardly, while embossments 84a are formed outwardly, as best shown in FIG. 11. Such embossments materially strengthen the web 80 and thus aid in rigidifying the connector assembly 34'. As can be seen, the top and bottom edges of the strengthening member 80 have been bent inwardly to form generally horizontal shoulder portions 88, which additionally strengthen the web and the connector assembly against stress. As can be seen in FIG. 10, the strengthening members are of such length that they do not necessarily engage the inner end surface of the respective end cross member, but are spaced somewhat therefrom as at 90. In other respects, the FIGS. 10 to 12 assembly may be generally similar to that of the first mentioned connector assembly 34.

Figures 17, 18:
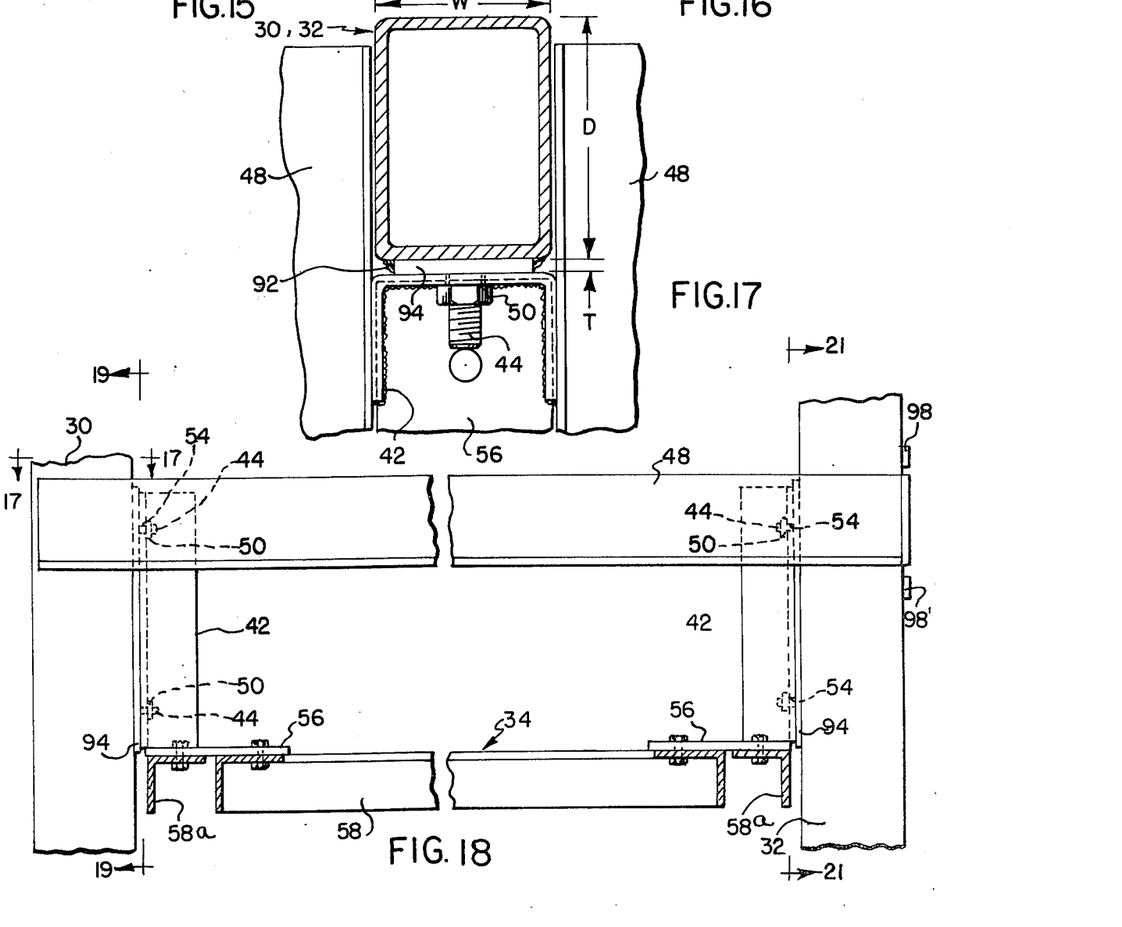
Figure 19:
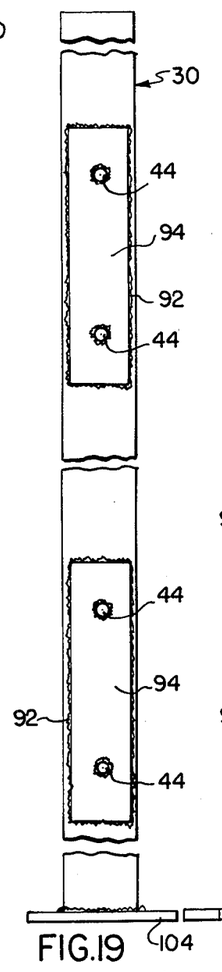
FIG. 19 is a broken, end elevational view of one of the fabricated travel zone columns of the FIG. 18 ladder, taken generally along the plane of line 19—19 of FIG. 18, looking in the direction of the arrows.
Figure 20:
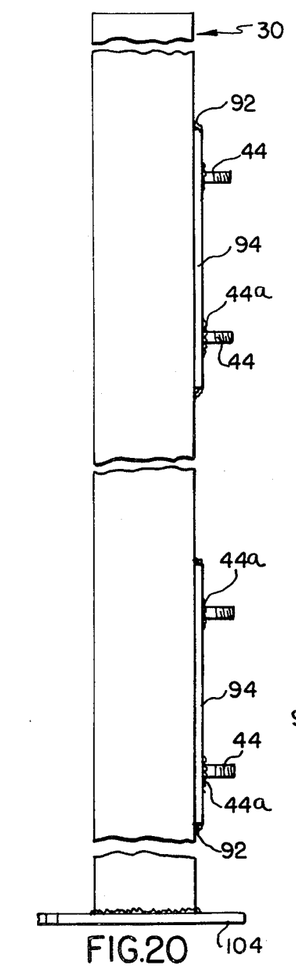
FIG. 20 is a broken, side elevational view of the column of FIG. 19.
Figure 21:
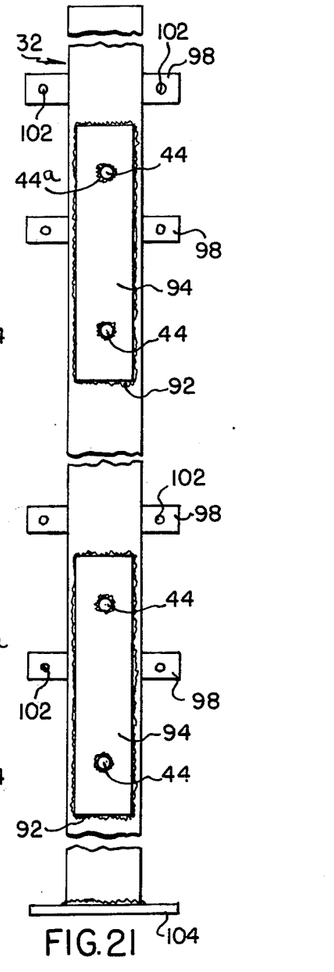
FIG. 21 is a broken, end elevational view of one of the outer columns of the FIG. 18 ladder, taken generally along the plane of line 21—21 of FIG. 18.

Referring now to FIGS. 17 and 18, there is illustrated another embodiment wherein the posts or columns 30, 32 each comprises a hollow, polygonal (in horizontal cross section) relatively thin walled tubular member which is of a narrower width W as compared to the depth D. Secured as by welds 92 to one face of the tubular column 30 or 32 are a plurality of facial plates 94 disposed in predetermined spaced relation along the height of the associated column (FIGS. 18 through 22) and which have the studs 44 secured to the exterior face thereof, as by means of the welds 44a. The thickness T (FIG. 17) of plate 94 should be at least ⅛ the base diameter of the associated welded stud 44.

The studs 44 are threaded at their distal ends, similarly to the other described embodiments, and are adapted to receive thereon a coacting threaded nut when the studs are received through the complementary openings 54 in the cross member of the associated connecting member assembly 34, 34a, or 34b. Hereagain, and as can be seen in FIG. 18, the cross member 42 of the connecting member assembly engages in flat surface-to-surface engagement with the front face of the associated facial plate 94, the latter extending substantially the same vertical distance as the vertical height of the respective cross member 42 and being coextensive therewith. As best illustrated in FIGS. 18 through 22, there are preferably a pair of vertically spaced studs 44 associated with each of the facial plates 94, for drawing the associated cross member 42 of the connecting member assembly into tight surface-to-surface engagement.

As can be best seen from FIGS. 18 through 21, aisle or travel zone column 30 (FIGS. 19 and 20) is substantially identical to the outer column 32 (FIGS. 21 and 22) except that the outer column 32 embodies anchor plates 98 secured to the rearward face thereof, for attaching thereto the diagonal stringers 100 (FIG. 1) which aid in rigidifying the storage frame structure. Anchor plates 98 have openings 102 therein which are adapted to receive suitable fastener means for securing the anchor plates 98 to the stringers 100. It will be seen that with such an arrangement the columns can be mass produced in an assembly line procedure, providing for automatic welding operations of the facial plates 94 and the studs 44 to the column, as well as facilitating attachment of the anchor plates 98 to the opposite face of the respective column. Footer plates 104 (FIGS. 19 through 22) may also be secured to the respective column for facilitating attachment of the column to the supporting floor surface.

Figure 23:
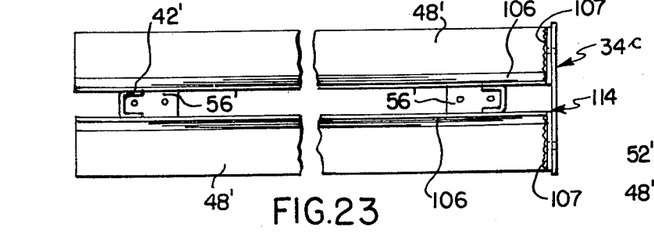
FIG. 23 is a broken top plan view of a load supporting, connecting member assembly, generally similar to FIG. 13, but showing a thin gage modification thereof.
Figure 24:
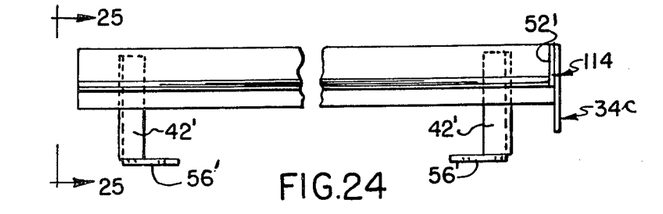
FIG. 24 is a broken side elevational view of the FIG. 23 assembly.
Figure 25:
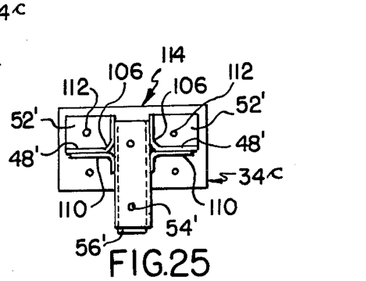
FIG. 25 is an end elevational view taken generally along the plane of line 25—25 of FIG. 24.

Referring now to FIGS. 23 to 25 there is illustrated another embodiment 34C of connecting assembly, which is usable in the storage rack in the same general manner as are the other described connecting assemblies. Assembly 34C is formed of thin gage metal such as for instance sheet metal of a gage of at least 16 or greater, thus resulting in a relatively light-weight connecting member assembly. Also, while in this embodiment, the load support members 48' are of generally angle shape in vertical cross section, similarly to the corresponding members in the first described embodiments, it will be seen that members 48' also embody a sloping section 106 at the juncture of the walls thereof, which is adapted to provide for sliding movement of an associated load, such as for instance a pallet on which a load of stock rests, downwardly away from the vertical wall section of the load support member, into generally centered relationship with respect to the horizontal load supporting section of each supporting member 48'. Sections 106 preferably have approximately a 60° slope. Moreover, angle shaped strengthening ribs 110 underlie each of the load supporting members 48', and is secured thereto as by means of spot welds, thus strengthening the rigidity of the supporting members 48' and their ability to support loads thereon in bridging relation thereacross.

Load stop plate sections 52' associated with the rear end of each of the load supporting members 48', may be attached as by welds 107 (FIG. 23) to the associated supporting member 48' with such load stops preferably having an opening 112 therethrough, for a purpose to be hereinafter set forth.

Figure 22:
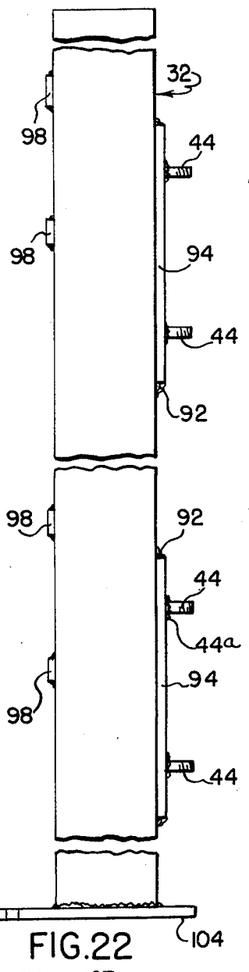
FIG. 22 is a broken, side elevational view of the column of FIG. 21.

Separable anchor plates 114 may be provided, which have openings therein which are complementary located with respect to the openings 112, in the end stops 52', with such aligned openings being adapted to receive fasteners, such as threaded bolts and nuts, which will not only secure the anchor plate 114 to the end stops 52' of the associated connecting assembly, but also can be used to secure the diagonal strengthening stringers 100 (FIG. 1) to the anchor plates 114. It will be seen therefore that the anchor plates 114 take the place of the anchor plates 98 on the outer columns, as shown for instance in FIGS. 21 an 22, with the anchor plates 114 being detachably secured to the respective connecting member assembly. Use of detachable anchor plates 114 eliminates the need for a difference between the aisle columns (e.g. 30) and the outer columns (e.g. 32) and therefore the columns for forming all of the ladders in the storage rack structure can be identical in construction as manufactured at the manufacturing plant, rather than having to weld additional anchor arms 98 to the outer columns. Accordingly, manufacture of the columns is materially facilitated simplifying the manufacturing, handling, storage and shipping problems associated therewith.

It will be understood that if it is found necessary to further rigidify the connecting member assembly 34C, that a rigidifying strut (e.g. 80) similar to that disclosed in FIGS. 10 through 12 may be added to the assembly 34C, and in a similar manner as disclosed in the aforementioned FIGS. 10 through 12.

Figure 26:
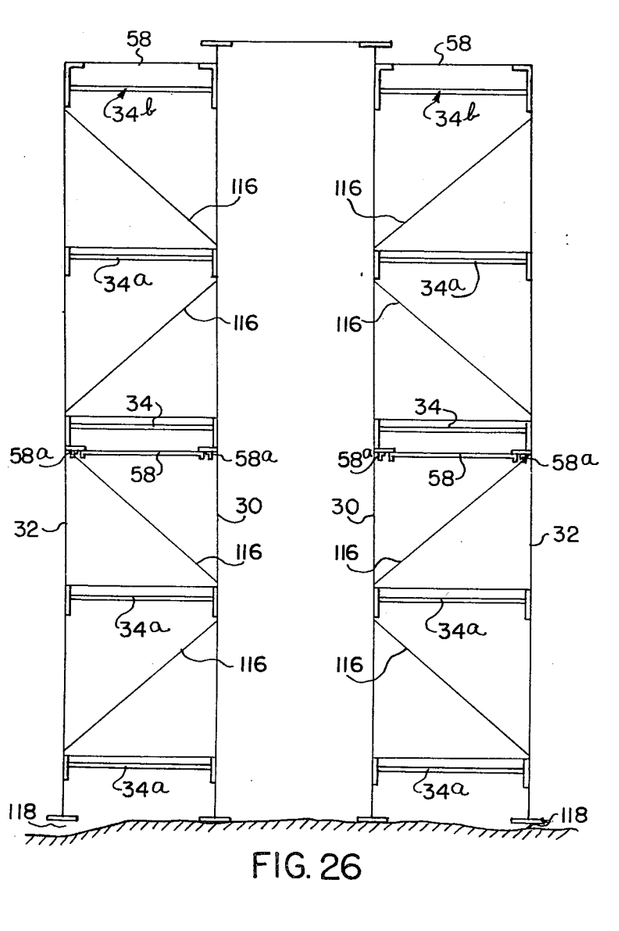
FIGS. 26 and 27 are diagrammatic illustrations of respectively "ladder" structure embodying conventional diagonal bracing (FIG. 26) and "ladder" structure embodying no diagonal bracing (FIG. 27), and illustrating floor settling conditions.
Figure 27:
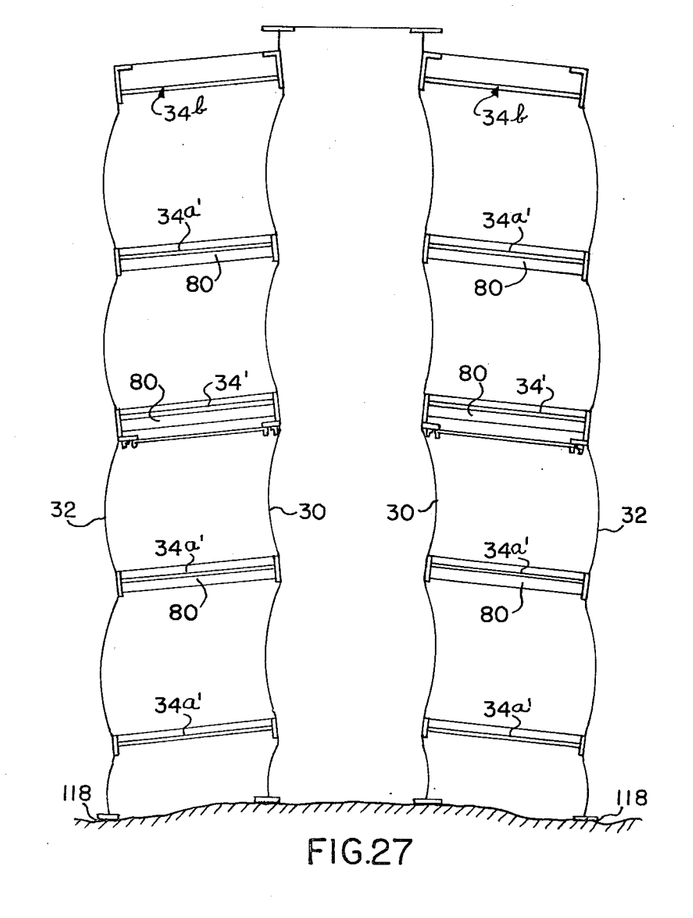

Referring now to FIGS. 26 and 27, there is illustrated diagrammatically "ladders" of a storage rack, with, in FIG. 26, the "ladders" including diagonal bracing members 116 of known construction. If a floor settling condition occurs, as indicated in exaggerated form at 118, leaving unsupported columns of the "ladders", substantial internal stresses are created.

FIG. 27 illustrates "ladders" of a storage rack embodying connecting member assemblies 38', 34a' which include strengthening means (e.g. 80 — FIGS. 10, 11 and 12) for aiding in maintaining the diagonal integrity of the connecting member assemblies. As can be seen, not all of the connecting member assemblies in the FIG. 27 embodiment necessarily include a strengthening web means 80. In the event of a floor settling condition (shown in exaggerated form at 118) the post or columns 30, 32 may assume a slight O.G. curve shape, averaging generally to perpendicular, as necessary to avoid internal stresses set up in the FIG. 26 ladder assemblies under a similar floor settling condition.

Moreover, it will be seen that with an arrangement as shown in FIG. 27, the commercial tolerances available to a rack installation contractor would be considerably broadened. For instance instead of requiring a tolerance of + or − 1/64 inch, for leveling the connecting member assemblies in a storage rack installation, a tolerance of for instance + or − 1/16 inch might be set forth, thus materially aiding in lowering the installation costs of a storage rack.

When the various parts of the storage rack are assembled on site by assembling the various parts and tightening the fastener means, a highly rigid and uniform storage rack is produced. As can be readily seen from the drawings, most of the components for the rack are of generally linear configuration facilitating the handling thereof during the manufacturing process and the shipping and handling at the site.

From the foregoing description and accompanying drawings, it will be seen that the invention provides a novel storage rack for use in a warehousing system and one which includes generally linear, economically desirable components which when assembled together give a highly rigid assembly, which is resistant to joint separation of the columns and associated laterally extending connector assemblies. The invention also provides in one embodiment, for prestressing of the connections between the laterally extending connector assemblies and the columns, which increases the rigidity of the connections of the storage rack. The invention also provides a novel method for the production of ladders for a storage rack, without the necessity for vertical plane diagonal bracing in the ladder structure.

The terms and expressions which have been used are used as terms of description and not of limitation and there is no intention in the use of such terms and expressions of excluding any equivalents of any of the features shown or described or portions thereof and it is recognized that various modifications are possible within the scope of the invention claimed.

What is claimed is:

1. In a structural unit, such as for instance, a storage framework for a warehousing system, including a travel zone running alongside said storage framework for movement of a mechanical load carrier therein operable for depositing loads into and withdrawing loads from the storage framework, said storage framework comprising, spaced generally vertical load supporting hollow, polygonal, in horizontal cross section, column members, and connecting members extending laterally between respective pairs of said column members and being connected thereto by actuatable fastener means, at least certain of said column members comprising on one face thereof generally flat vertically spaced facial plates rigidly secured thereto in generally surface-to-surface relation with said fastener means being secured to the exterior face of the respective facial plate and projecting generally perpendicularly outwardly therefrom, each said connecting member including a cross portion disposed in confronting engaged relation with said exterior face of the respective facial plate and generally horizontal load support means secured to said cross portion, said fastener means extending from said respective facial plate through complementary openings in said cross portion and coacting between the latter and said respective facial plate to clamp said cross portion into tight surface-to-surface relation with the said respective facial plate, said cross portion being vertically elongated and extending vertically a substantial distance beyond the level of said load support means to rigidify the connection between the connecting member and the respective column member, and wherein said cross member is substantially vertically co-extensive with said respective facial plate.

2. A unit in accordance with claim 1 wherein one column of each said pair comprises a travel zone column disposed in a row of travel zone columns extending along said travel zone, and the other column member of each said pair comprises an outer column spaced laterally outwardly from the respective travel zone column and disposed in a row of outer columns extending generally parallel to said row of travel zone columns, said connecting members in conjunction with said columns defining the storage volumes in said framework, each said travel zone column and said outer column being generally identical in structure, said plates being secured to the respective column by welds and said fastener means comprising studs secured to said exterior face by welds, each of said certain column members being relatively thin walled as compared to the thickness of each of the respective plates, and rigidifying means secured to at least certain of said outer columns in said row and coacting therewith to rigidify said storage framework.

3. A unit in accordance with claim 1 wherein said load support means comprises a pair of laterally spaced generally horizontal load support rails secured to said cross portion, the latter being disposed intermediate said rails generally adjacent one end of the last mentioned pair, said cross portion having anchoring means thereon at its lower end disposed in a plane generally perpendicular to the direction of extension of said cross portion, and generally horizontal stringers secured to the last mentioned means.

4. A unit in accordance with claim 1 wherein said load support means comprises a pair of laterally spaced generally horizontal load support rails secured to said cross portion, the latter being disposed intermediate said rails generally adjacent one end of the last mentioned pair, said cross portion being channel shaped in horizontal section with the open face of the channel facing in a direction away from said exterior face of the respective plate, said cross portion adjacent its lower end having anchoring means thereon disposed in a plane generally perpendicular to the direction of extension of said cross portion, and generally diagonal, with respect to said travel zone, stringers disposed in a generally horizontal plane, secured to said anchoring means.

5. A unit in accordance with claim 1 wherein said load support means comprises a pair of laterally spaced generally horizontal load support rails secured to said cross portion, the latter being disposed intermediate said rails generally adjacent one end of the last mentioned pair, said rails extending laterally beyond said cross portion a predetermined amount to define a recess in which the respective column member is received in nested relation, said cross portion having anchoring means thereon adjacent its lowermost end disposed in a plane generally perpendicular to the vertical direction of extension of said cross portion, and generally horizontal stringers secured to said anchoring means, said stringers extending generally parallel to said travel zone, and generally diagonally oriented stringers disposed in a generally horizontal plane also secured to said anchoring means, the last mentioned stringers being diagonally oriented with respect to said travel zone.

6. A unit in accordance with claim 1 wherein said fastener means comprises cylindrical studs threaded at their distal ends and secured by welds to the respective facial plate, the thickness of each of said plates being at least $\frac{1}{3}$ of the base diameter of each of said studs.

* * * * *